United States Patent [19]

Taniguchi

[11] Patent Number: 4,612,144

[45] Date of Patent: Sep. 16, 1986

[54] METHOD OF MAKING LIGHT GUIDE MEMBER

[75] Inventor: Yutaka Taniguchi, Kanagawa, Japan

[73] Assignee: Fuji Photo Film Co., Ltd., Kanagawa, Japan

[21] Appl. No.: 601,200

[22] Filed: Apr. 17, 1984

[30] Foreign Application Priority Data

Apr. 18, 1983 [JP] Japan .................................. 58-67978

[51] Int. Cl.$^4$ ............................................. B29C 53/04
[52] U.S. Cl. .................................... 264/1.5; 264/162; 264/230; 264/339; 425/DIG. 48
[58] Field of Search ................. 264/1.5, 2.7, 230, 339, 264/295, DIG. 71, 153, 162

[56] References Cited

U.S. PATENT DOCUMENTS

| | | |
|---|---|---|
| 3,000,057 | 9/1961 | Swedlow et al. .................... 264/230 |
| 3,497,577 | 2/1970 | Wichterle ............................ 264/230 |
| 3,534,134 | 10/1970 | Mathews ............................. 264/230 |
| 3,740,207 | 6/1973 | Bogrets et al. ...................... 264/339 |
| 3,847,721 | 11/1974 | Evans .................................. 264/230 |
| 3,894,137 | 7/1975 | Moench ............................. 264/248 |
| 4,208,363 | 6/1980 | Yevick ................................ 264/1.5 |

Primary Examiner—James Lowe
Attorney, Agent, or Firm—Sughrue, Mion, Zinn, Macpeak & Seas

[57] ABSTRACT

A front end portion of a flat plate-like transparent thermoplastic material is grasped as bent so that the middle section thereof is convex. The thermoplastic material is heated and softened, and the rear end portion of the thermoplastic material is rounded cylindrically in the same direction as the bending direction of the front end portion. The thermoplastic material is then allowed to cool gradually, so that the front end portion has a flat plate-like shape after the gradual cooling. The cylindrical rear end portion is cut and the cut face is planished.

8 Claims, 9 Drawing Figures

METHOD OF MAKING LIGHT GUIDE MEMBER

BACKGROUND OF THE INVENTION

1. Field of the Invention

This invention relates to a method of making a light guide member composed of a thermoplastic material for light transmission and having one linear end portion and one approximately cylindrical end portion. This invention particularly relates to a method of making a light guide member composed of a thermoplastic material which involves a high level of residual internal stress due to plastic deformation.

2. Description of the Prior Art

Light guide members having a linear portion at one end and an approximately cylindrical portion at the other end are used, for example, for accurately detecting light emitted from stimulable phosphors upon stimulation thereof in a radiation image recording and reproducing apparatus. In the radiation image recording and reproducing apparatus, a stimulable phosphor is exposed to a radiation passing through an object to have a radiation image stored therein, and then scanned with stimulating rays which cause the stimulable phosphor to emit light in proportion to the radiation energy stored. The emitted light is detected and converted into an electric image signal, and a visible image is reproduced by use of the obtained electric image signal.

After the electric image signal is obtained by photoelectrically detecting the light emitted from the stimulable phosphor upon stimulation thereof, signal processings such as gradation processing and frequency processing are conducted on the electric image signal to obtain a visible radiation image having a desired quality. This step can be achieved relatively easily. However, if the light emitted from the stimulable phosphor upon stimulation thereof is not detected sufficiently or uniformly in the readout step, the electric image signal obtained thereby becomes insufficient or non-uniform. Thus it is not always possible to obtain a correct, uniform visible radiation image. Therefore, in the read-out apparatus, it is desired to use a light guide member which sufficiently collects the light emitted from the stimulable phosphor upon stimulation thereof and which exhibits an equal light collecting efficiency over the entire surface of the sheet comprising the stimulable phosphor scanned with stimulating rays such as laser beams.

Figure 1:
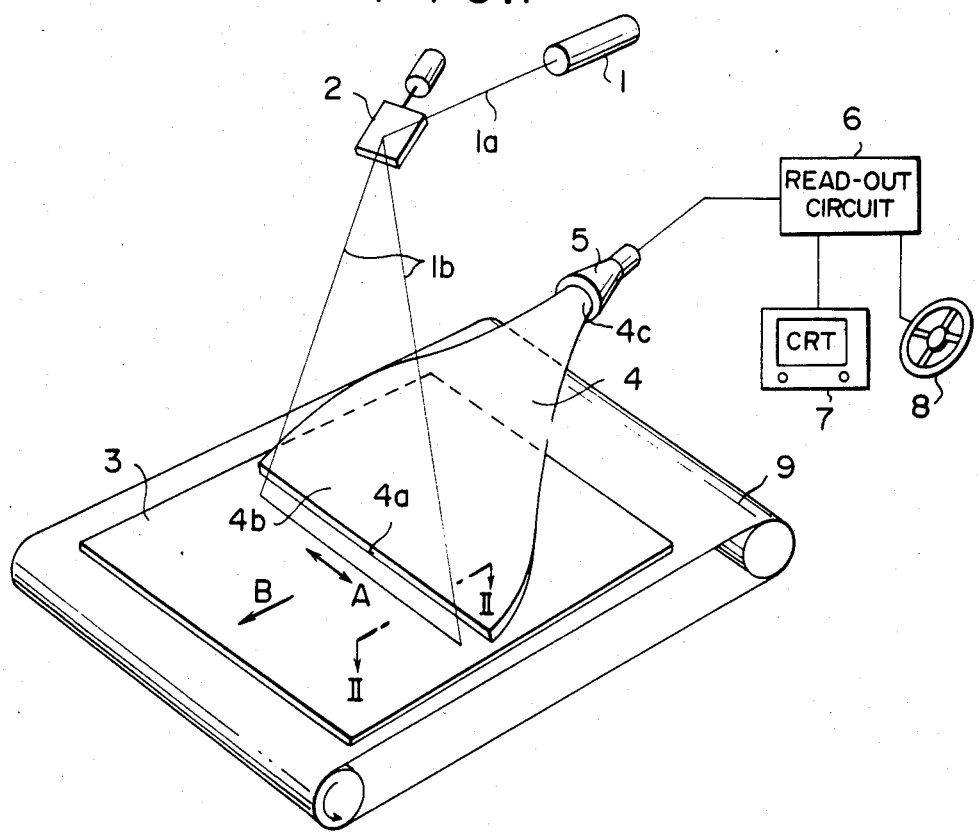
FIG. 1 is a schematic view showing an example of a radiation image recording and reproducing apparatus.

A laser beam 1a of a predetermined intensity is emitted from a laser beam source 1 onto a galvanometer mirror 2. The laser beam 1a is deflected by the galvanometer mirror 2, and the deflected laser beam 1b thus obtained is directed onto a stimulable phosphor sheet 3 positioned below the galvanometer mirror 2 so that the stimulable phosphor sheet 3 is scanned with the laser beam 1b in the main scanning direction indicated by the arrow A, i.e. in the width direction of the sheet 3. While the laser beam 1b impinges upon the stimulable phosphor sheet 3, the sheet 3 is moved, for example, by an endless belt 9, in the sub-scanning direction indicated by the arrow B. Thus main scanning is repeated at an angle approximately normal to the sub-scanning direction and, consequently, the whole area of the stimulable phosphor sheet 3 is scanned with the laser beam 1b in two directions. As the stimulable phosphor sheet 3 is scanned with the laser beam 1b, the portion of the sheet 3 exposed to the laser beam 1b emits light having an intensity proportional to the radiation energy stored. The emitted light enters a transparent light guide member 4 from a front end face 4a thereof positioned near the stimulable phosphor sheet 3 in parallel with the main scanning line on the sheet 3. The light guide member 4 is formed into a flat shape at a front end portion 4b thereof positioned near the stimulable phosphor sheet 3, and gradually formed into a cylindrical shape towards the rear end side so as to fabricate an approximately cylindrical rear end portion 4c. The end face of the rear end portion 4c is closely contacted with a photomultiplier 5. Thus the light entering from the front end face 4a is guided in the inside of the light guide member 4 to the rear end portion 4c and transmitted to the photomultiplier 5. The light is then converted into an electric image signal by the photomultiplier 5, and sent to an image read-out circuit 6, in which the electric image signal is processed. The electric image signal thus processed is then sent to a cathode ray tube (CRT) 7 for displaying a visible image or to a magnetic recording apparatus for recording the electric image signal in a magnetic tape 8.

Figure 2:
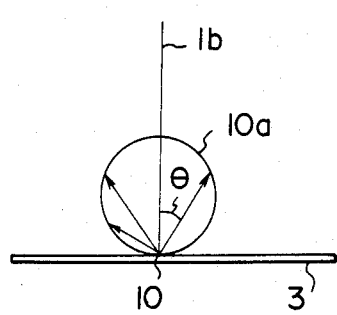
FIG. 2 is a side view showing the intensity distribution of light emitted from a stimulable phosphor sheet upon stimulation thereof in the apparatus of FIG. 1.

As described above, the light emitted from the stimulable phosphor sheet 3 upon stimulation thereof is collected and guided by the light guide member 4. When the stimulable phosphor sheet 3 is exposed to the laser beam 1b, the intensity distribution of the light emitted from the sheet 3 becomes as shown in FIG. 2. That is, when the laser beam 1b impinges upon the stimulable phosphor sheet 3 in the direction normal to the surface of the sheet 3, the light emitted from the sheet 3 at an angle $\theta$ with respect to the laser beam 1b has an intensity proportional to $\cos \theta$. Thus the emitted light has an intensity distribution spreading from a point 10, at which the laser beam 1b impinges upon the stimulable phosphor sheet 3, towards a circle 10a. The light having such an intensity distribution is generally called Lambert light.

Figure 3:
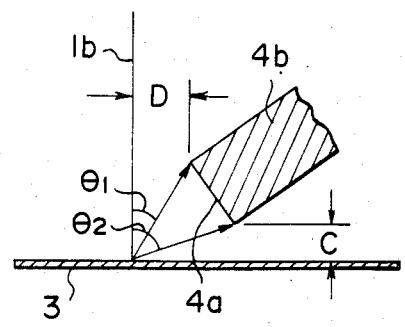
FIG. 3 is a sectional view taken along line II—II of FIG. 1, FIGS. 4 and 5 are perspective views showing the conventional processes for producing a light guide member.

FIG. 3 is a sectional view taken along line II—II of FIG. 1. As shown in FIG. 3, only the light emitted from the stimulable phosphor sheet 3 at an angle within the range between $\theta 1$ and $\theta 2$ with respect to the laser beam 1b enters into the front end face 4a of the light guide member 4 and is guided therethrough to the photomultiplier 5.

Accordingly, in order to make the light guiding efficiency uniform over the whole scanning surface as described above, the relationship between the position of the front end face 4a of the light guided member 4 and the position of the stimulable phosphor sheet 3 must be identical in the width direction of the front end face 4a. That is, in FIG. 3, the angle $\theta1$ and $\theta2$ and the dimensions C and D must be constant over the entire width of the front end face 4a of the light guide member 4. Stated differently, the front end portion 4b of the light guide member 4 must have a flat shape free from distortion in the width direction thereof.

The light guide member 4 is fabricated, for example, of a transparent acrylic plate so that one end portion thereof is formed into a flat shape and the other end portion thereof is formed into a cylindrical shape. Since the light guide member 4 must have such a special configuraiton, it is not always possible tomaintain the aforesaid angles $\theta1$ and $\theta2$ and the dimensions C and D constant over the entire width of the front end portion 4b. Namely, the front end portion 4b of the light guide member 4 is readily distorted. This will further be described below with reference to the conventional method of producing the light guide member 4.

Figure 4:
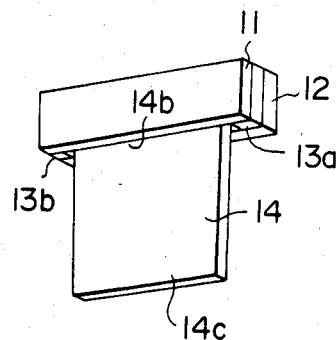
Figure 5:
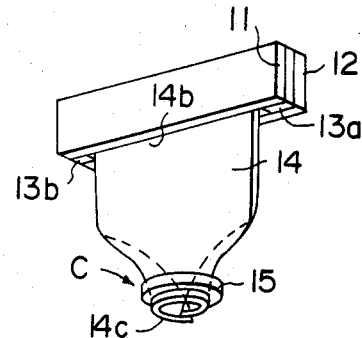

FIGS. 4 and 5 are perspective views showing the conventional method of producing a light guide member. First, as shown in FIG. 4, a thermoplastic material 14, such as a transparent acrylic plate, having a predetermined thickness and a rectangular shape is prepared, and a front end portion 14b of the thermoplastic material 14 is grasped between flat plates 11 and 12. Then, the thermoplastic material 14 is heated to a temperature within the plastic region thereof (about 170° C. for an acrylic plate). In order to maintain the space between the flat plates at a predetermined value even after heating, spacers 13a and 13b are positioned on opposite sides of the thermoplastic material 14 between the flat plates 11 and 12. Then, as shown in FIG. 5, a rear end portion 14c of the thermoplastic material 14, heated to the plastic condition, is rounded cylindrically and inserted into a ring-like guiding jig 15 downwardly. Thus the rear end portion 14c of the thermoplastic material 14 is plastically deformed into a cylindrical shape to match the inner surface shape of the guiding jig 15. Thereafter, the thermoplastic material 14 is allowed to cool gradually to room temperature, and the flat plates 11 and 12 are removed. The rear end portion 14c is cut at the position indicated by the arrow C above the guiding jig 15, and the cut face is planished to obtain the aforesaid light guide member 4.

Figure 6A:
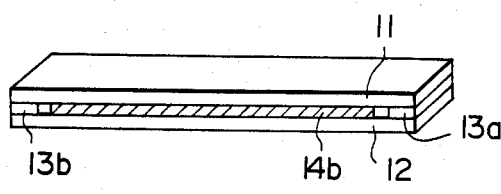
FIG. 6A is a perspective view showing the grasping jig employed in the conventional processes for producing a light guide member.
Figure 6B:
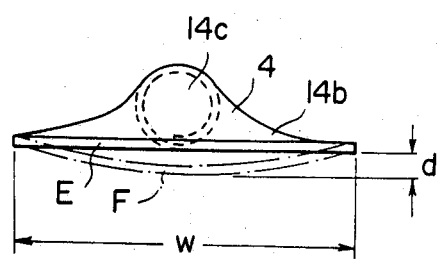
FIG. 6B is a front view showing the light guide member produced by the conventional processes.

FIG. 6A is a perspective view showing the flat plates 11 and 12 of FIGS. 4 and 5 grasping the front end portion 14b of the thermoplastic material 14 therebetween. As shown in FIG. 6A, while the front end portion 14b of the thermoplastic material 14 is grasped between the flat plates 11 and 12, it is maintained in the plane-like shape. However, when the flat plates 11 and 12 are removed after the thermoplastic material 14 is plastically deformed and allowed to cool gradually to form the light guide member 4, the front end portion 14b of the light guide member 4 becomes undesirably deformed to a concave shape at the middle portion of the same surface as the outside of the cylindrical rear end portion 14c, as shown in FIG. 6B. Specifically, in FIG. 6B, the front end portion 14b maintained in the plane-like shape as indicated by the full line E when the front end portion 14b is grasped between the flat plates 11 and 12 becomes deformed in the convex shape as indicated by the chain line F. The amount of deformation is, for example, about 0.5 mm when the thickness of the front end portion 14b is 12 mm and the width thereof is 400 mm, though the amount of deformation changes depending on the size of the cylindrical rear end portion 14c. When the shape and the dimensions of the light guide member 4 are the same, the shape and the extent of deformation are always approximately the same.

Since the front end portion 14b (4b in FIG. 3) of the light guide member 4 is deformed in the concave shape as described above, the angles $\theta1$ and $\theta2$ and the dimensions C and D shown in FIG. 3 change in the width direction of the front end portion 4b. As a result, the light guiding efficiency becomes low, and the amount of light collected by the aforesaid front end face 4a of the light guide member 4 is not uniform in the width direction of the front end portion 4b. For example, when the front end portion 4b has a width of 400 mm and is deformed by 0.5 mm in the concave shape, the light guiding efficiency at the middle portion of the front end portion 4b becomes 10% to 15% lower than that at both end portions in the width direction of the front end portion 4b. Further, when the extent of deformation at the middle portion of the front end portion 4b becomes large, there arises a problem that the middle portion of the light guide member 4 contacts and scratches the upper surface of the stimulable phosphor sheet 3.

The aforesaid deformation of the front end portion 14b (4b) is presumably attributable to internal residual stress arising due to plastic deformation of the rear end portion 14c of the thermoplastic material 14. Therefore, it was thought that prevention of the deformation of the front end portion 14b could be realized by conducting treatment for removing the internal stress, such as annealing. However, even when annealing was carried out, the amount of deformation changed very little, and it was found that annealing had virtually no effect on the prevention of the deformation of the front end portion 14b.

Another approach considered for the prevention of the deformation of the front end portion 14b of the light guide member 4 was that of processing the deformed surfaces of the front end portion 14b into a plane-like shape after the light guide member 4 is formed as described above. However, in this method, the thickness of the front end portion 14b becomes thin, and the light guiding efficiency becomes low. Otherwise the boundary between the processed section and the unprocessed section becomes discontinuous and in this case, since light transmitted inside the light guide member 4 leaks from the discontinuous section to the outside, the light guiding efficiency becomes low. Also, external light enters the light guide member 4 from the discontinuous section and constitutes noise interfering with the formation of a visible radiation image. Thus this method is not a suitable one.

SUMMARY OF THE INVENTION

The primary object of the present invention is to provide a method of making a light guide member, which accurately forms the light guide member having a desired shape and exhibiting an improved light guiding efficiency in a simple manner.

Another object of the present invention is to provide a method of making a light guide member, which is inexpensive and which provides a high production yield.

The present invention provides a method of making a light guide member composed of a transparent thermoplastic material and having a flat plate-like shape at one end portion and an approximately cylindrical shape at the other end portion, the method comprising the steps of:

(i) holding one end portion of a flat plate-like transparent thermoplastic material as bent so that the middle section of said one end portion is convex, (ii) heating and softening said transparent thermoplastic material, (iii) clamping the other end portion of said transparent thermoplastic material as rounded cylindrically in the same direction as the bending direction of said one end portion of said transparent thermoplastic material, and (iv) allowing said thermoplastic material to cool gradually, (v) whereby said one end portion of said thermoplastic material has a substantially flat plate-like shape after the gradual cooling.

In the method of the present invention, a light guide member having one flat plate-like end portion and one cylindrical end portion and exhibiting an improved light guiding efficiency can be easily fabricated to a desired shape at a high accuracy by use of simple jigs. Further, since the method of the present invention requires no secondary heat treatment such as annealing nor processing after forming, the method is relatively inexpensive and provides a high production yield.

DESCRIPTION OF THE PREFERRED EMBODIMENTS

The present invention will hereinbelow be described in further detail with reference to the accompanying drawings.

Figure 7A:
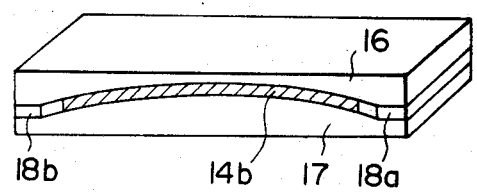
FIG. 7A is a perspective view showing the grasping jig employed in an embodiment of the method of making a light guide member in accordance with the present invention.
Figure 7B:
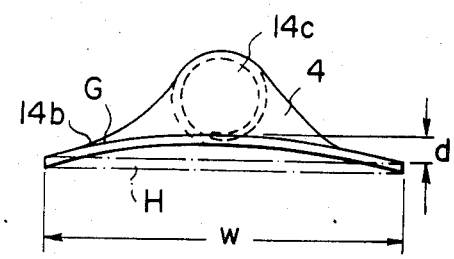
FIG. 7B is a front view showing an example of the light guide member produced by the method in accordance with the present invention.

Referring to FIG. 7A, the grasping jig employed in the method of the present invention comprises grasping members 16 and 17. The front end portion 14b of the thermoplastic material 14 is grasped between the grasping members 16 and 17 so that the middle section of the front end portion 14b is convex upwardly in the case where the surface of the thermoplastic material 14 which is rounded cylindrically and becomes the outer side faces up in FIG. 7A. Then, the thermoplastic material 14 is heated and softened, and the rear end portion 14c of the thermoplastic material 14 is rounded cylindrically as mentioned above. The thermoplastic material 14 is then allowed to cool to form the light guide member 4, and the grasping members 16 and 17 are removed from the light guide member 4. As shown in FIG. 7B, just after the grasping members 16 and 17 are removed, the middle section of the front end portion 14b is convex upwardly as indicated by the full line G. Thereafter, the front end portion 14b is deformed with time, and ultimately exhibits an approximately flat plate-like shape as indicated by the chain line H. The shapes of the surfaces of the grasping members 16 and 17 standing face to face with each other, so as to grasp the front end portion 14b of the thermoplastic material 14, must be determined to accommodate the amount of deformation of the front end portion 14b by measuring in advance the amount of deformation arising after the light guide member 4 is produced by use of a grasping jig having parallel surfaces. For example when the width W of the front end portion 14b is 400 mm and the deformation amount d arising as shown in FIG. 6B is about 0.5 mm, the shapes of the surface of the grasping members 16 and 17 as shown in FIG. 7A should be such that the front end portion 14b grasped therebetween is convex by about 0.5 mm upwardly for the width W of the front end portion 14b of 400 mm. In this case, it was found that there could be obtained a light guide member 4 with a front end portion 14b having an approximately flat plate-like shape. The surfaces of the grasping members 16 and 17 may be shaped as described above by deforming flat plates having parallel surfaces or by processing the surfaces of flat plates to the desired surface shapes by grinding or the like.

The method of the present invention markedly improves production yield. For example, when the conventional grasping jig as shown in FIG. 6A is used, the production yield is about 60%. However, when the method of the present invention is used, the production yield is improved to a value within the range of about 90% to 95%.

I claim:

1. A method of making a light guide member composed of transparent thermoplastic material and having a flat plate-like shape at one end portion and an approximately cylindrical shape at the other end portion, the method comprising the steps of:

(i) bending a flat plate-like transparent thermoplastic material by holding one end portion in a position so that the middle section of said one end portion is convex, (ii) heating and softening said transparent thermoplastic material, (iii) rounding the other end portion of said transparent thermoplastic material cylindrically in the same direction as the bending direction of said one end portion of said transparent thermoplastic material; and (iv) allowing said thermoplastic material to cool gradually, (v) whereby said one end portion of said thermoplastic material has a substantially flat plate-like shape after the gradual cooling.

2. A method as defined in claim 1 wherein said bending step comprises the step of grasping said one end portion of said thermoplastic material between grasping members having surface shapes adapted to hold said one end portion in a bent position so that the middle section of said one end portion is convex.

3. A method as defined in claim 1 wherein said thermoplastic material is an acrylic plate.

4. A method as defined in claim 1 wherein said light guide member is adapted to guide light emitted from a stimulable phosphor carrying a radiation image stored therein when said stimulable phosphor is scanned with stimulating rays.

5. A method as defined in claim 1 further comprising the steps of:

(vi) cutting said other end portion after rounding cylindrically so as to form a cut face, and (vii) planishing the cut face of said other end portion.

6. A method as defined in claim 5 wherein said bending step comprises the step of grasping said one end portion of said thermoplastic material between grasping members having surface shapes adapted to hold said one end portion in a bent position so that the middle section of said one end portion is convex.

7. A method as defined in claim 5 wherein said thermoplastic material is an acrylic plate.

8. A method as defined in claim 5 wherein said light guide member is adapted to guide light emitted from a stimulable phosphor carrying a radiation image stored therein when said stimulable phosphor is scanned with stimulating rays.

* * * * *